(12) United States Patent
Tanaka et al.

(10) Patent No.: US 11,297,205 B2
(45) Date of Patent: Apr. 5, 2022

(54) IMAGE FORMING APPARATUS AND NON-TRANSITORY COMPUTER READABLE MEDIUM

(71) Applicant: FUJIFILM BUSINESS INNOVATION CORP., Tokyo (JP)

(72) Inventors: Yushiro Tanaka, Kanagawa (JP); Seiji Shiraki, Kanagawa (JP); Nagamasa Misu, Kanagawa (JP); Ryosuke Tsuji, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/124,662

(22) Filed: Dec. 17, 2020

(65) Prior Publication Data

US 2021/0337085 A1 Oct. 28, 2021

(30) Foreign Application Priority Data

Apr. 22, 2020 (JP) .............................. JP2020-076042

(51) Int. Cl.
*H04N 1/60* (2006.01)

(52) U.S. Cl.
CPC ........... *H04N 1/6011* (2013.01); *H04N 1/603* (2013.01); *H04N 1/6022* (2013.01)

(58) Field of Classification Search
CPC ..... H04N 1/6011; H04N 1/6022; H04N 1/603
See application file for complete search history.

(56) References Cited

U.S. PATENT DOCUMENTS

| 6,600,574 B2 | 7/2003 | Miyano |
| 2003/0086101 A1* | 5/2003 | Miyano ................ H04N 1/6011 358/1.9 |

FOREIGN PATENT DOCUMENTS

| JP | 2000-47846 A | 2/2000 |
| JP | 2016-103695 A | 6/2016 |
| JP | 2016-221932 A | 12/2016 |

* cited by examiner

*Primary Examiner* — Christopher Wait
(74) *Attorney, Agent, or Firm* — Oliff PLC

(57) ABSTRACT

An image forming apparatus includes a memory and a processor configured to output an image formed based on image data including predetermined specific text after replacing a color of one or more portions in the image data with a special color that is in advance associated with the specific text, the one or more portions being assigned a color identical or similar to a color of the specific text to form the image.

14 Claims, 18 Drawing Sheets

FIG. 5

Special Color Printing

Printed matter can be output by using special color toner.
Assign color-specification text to specify a color for special color toner.

● Special Color Printing
○ No Special Color Printing

| Effective | Color-Specification Text | | Output Toner | Proportion |
|---|---|---|---|---|
| ☑ | 金 | Edit | Gold | 100% |
| ☑ | 銀 | Edit | Silver | 100% |
| ☐ | | Edit | | |
| ☐ | | Edit | | |

Apply New Assignment

Discard and Return

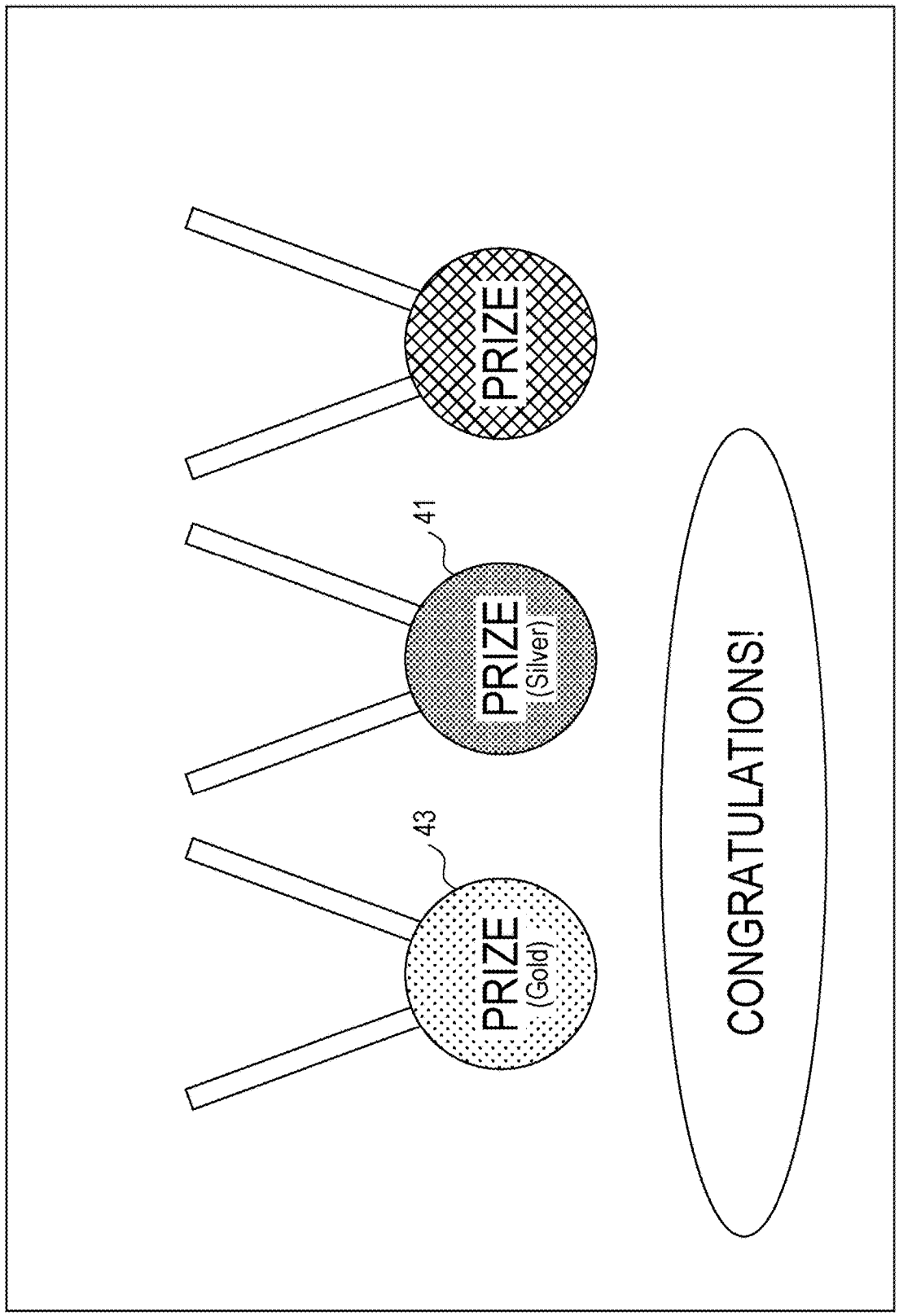

FIG. 14

Color-specification text " 金 " is found at multiple positions.
Which printing do you want to continue with?

☆ ☆ ☆ ☆
むかしむかし、
あしがら山の山奥に、
金太郎という名前の男の子がいました。
金太郎は … (Gold)
✛ ✛ ✛ ✛
✛ ✛ ✛ ✛

☆ ☆ ☆ ☆
むかしむかし、
あしがら山の山奥に、
金太郎という名前の男の子がいました。
金太郎は …
✛ ✛ ✛ ✛
✛ ✛ ✛ ✛

☐ Print by using special toner

☑ Print by using ordinary toner

Continue Printing

FIG. 16A
(RGB=255, 192, 0)
むかしむかし、
あしがら山の山奥に、
太郎という名前の男の子がいました。
(RGB=255, 0, 0)
FIG. 16B
むかしむかし、
あしがら山の山奥に、
太郎という名前の男の子がいました。
(RGB=255, 0, 0)

FIG. 18

Special Color Printing

Printed matter can be output by using special color toner.
Assign color-specification text to specify a color for special color toner.

● Special Color Printing
○ No Special Color Printing

[Register Color-Specification Text in Dictionary]

| Effective | Color-Specification Text | | Output Toner | Proportion |
|---|---|---|---|---|
| ✓ | 金 | Edit | Gold | 100% |
| ✓ | 銀 | Edit | Silver | 100% |
| ☐ | | Edit | | |
| ☐ | | Edit | | |
| ☐ | | | | |

[Apply New Assignment]   [Discard and Return]

| INPUT TEXT | CONVERTED TEXT |
|---|---|
| きん | |
| きんとなー | 金 |
| ごーるど | |
| とくしょく | |

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-076042 filed Apr. 22, 2020.

BACKGROUND

(i) Technical Field

The present disclosure relates to an image forming apparatus and a non-transitory computer readable medium.

(ii) Related Art

Japanese Unexamined Patent Application Publication No. 2000-047846 discloses a color printing method that enables an output color to be specified while a print image based on color image data is displayed as a preview screen and that enables color printing including printing using a special color without requiring a specialized application.

Japanese Unexamined Patent Application Publication No. 2016-103695 discloses an image forming apparatus that establishes an association between a special color and a substitute color in advance and that enables various applications to form images containing the special color by replacing the substitute color contained in image data with the special color associated with the substitute color.

Japanese Unexamined Patent Application Publication No. 2016-221932 discloses an image processing apparatus that analyzes character codes in document data. If the document data includes a character string corresponding to a specific character code, the image processing apparatus replaces the character string with a special color.

SUMMARY

As described above, there are existing image forming apparatuses that can use a color material of a special color and form an image containing a special color on a recording medium. However, to send a command to output an image containing such a special color to an image forming apparatus capable of forming an image containing a special color, software that supports the command to output a special color is necessary.

Aspects of non-limiting embodiments of the present disclosure relate to providing an image forming apparatus and a non-transitory computer readable medium storing a program that enable software that does not support an output command for a special color to send a command to output an image containing a special color.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Image Forming Apparatus

According to an aspect of the present disclosure, there is provided an image forming apparatus including a memory; and a processor configured to output an image formed based on image data including predetermined specific text after replacing a color of one or more portions in the image data with a special color that is in advance associated with the specific text, the one or more portions being assigned a color identical or similar to a color of the specific text to form the image.

BRIEF DESCRIPTION OF THE DRAWINGS

An exemplary embodiment of the present disclosure will be described in detail based on the following figures, wherein:

FIG. 5 is an illustration depicting an example of a display screen displayed by the terminal apparatus for setting color-specification text;

FIG. 11 is an illustration depicting an example of a result that is output from the image forming apparatus;

FIG. 14 is an illustration depicting a modification of the warning screen displayed by the terminal apparatus when the image data depicted in FIG. 13A is output;

FIG. 16A is an illustration depicting an example of image data, and FIG. 16B is an illustration depicting an output result for the image data depicted in FIG. 16A;

FIG. 18 is an illustration depicting a modification of the display screen displayed by the terminal apparatus for setting color-specification text.

DETAILED DESCRIPTION

An exemplary embodiment of the present disclosure will be described in detail with reference to the drawings.

Figure 1:
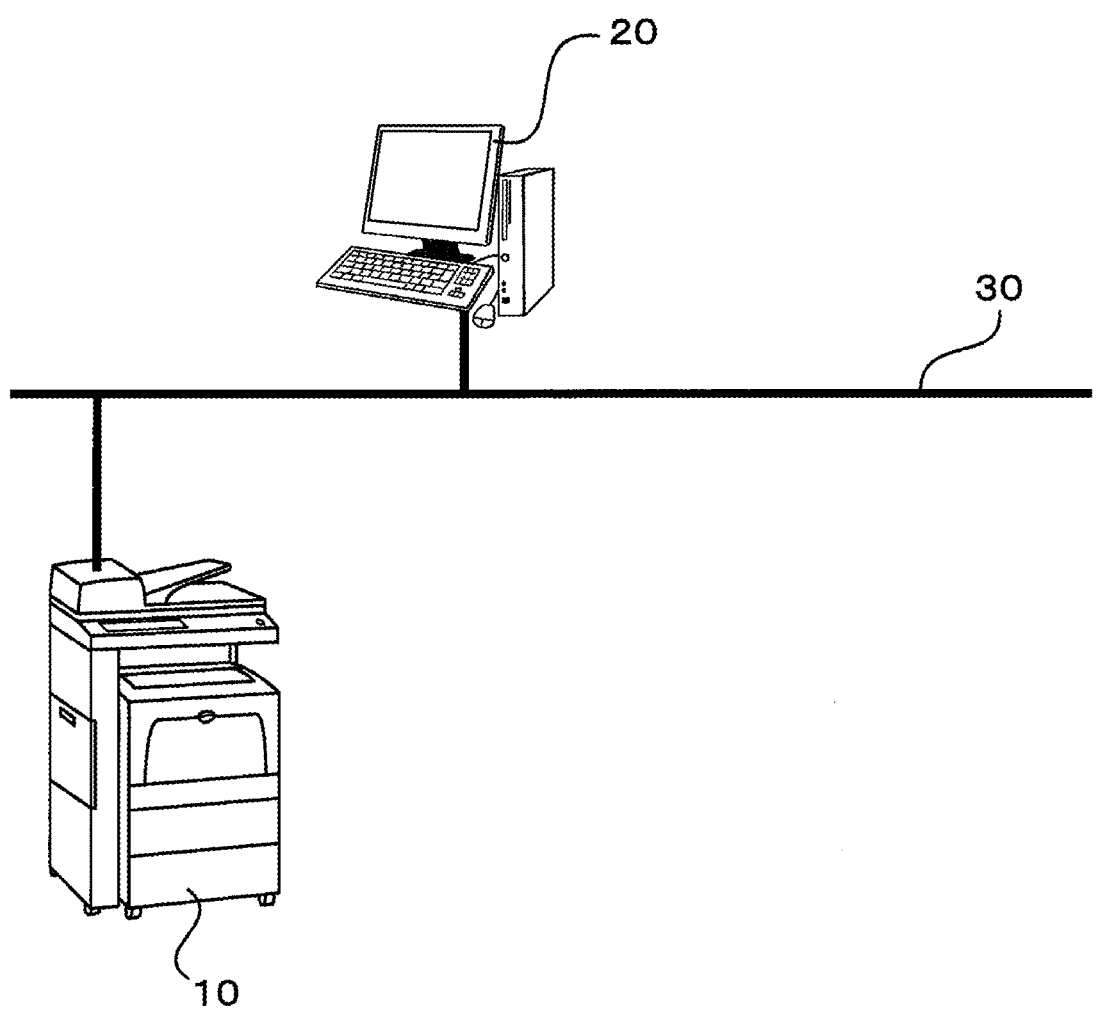
FIG. 1 is an illustration depicting a configuration of an image forming system according to the exemplary embodiment of the present disclosure.

FIG. 1 is an illustration depicting a configuration of an image forming system according to the exemplary embodiment of the present disclosure.

As depicted in FIG. 1, the image forming system according to the exemplary embodiment of the present disclosure includes an image forming apparatus 10 and a terminal apparatus 20, which are connected to each other by using a network 30. The terminal apparatus 20 creates image data and transmits the created image data to the image forming apparatus 10 via the network 30. The image forming apparatus 10 accepts the image data transmitted from the terminal apparatus 20 and outputs an image based on the image data on a recording medium such as a sheet of paper.

The image forming apparatus 10 has a plurality of functions such as a print function, a scan function, a copying function, and a facsimile function and is a so-called multi-function peripheral. The image forming apparatus 10 is configured to form an image on a recording medium by using basic color toners, which are yellow (Y), magenta (M), cyan (C), and black (K), and toners having a special color, such as silver (Si), gold (G), and white (W). The image forming apparatus 10 is not limited to a multifunction peripheral and may be an apparatus at least having a printing function.

Figure 2:
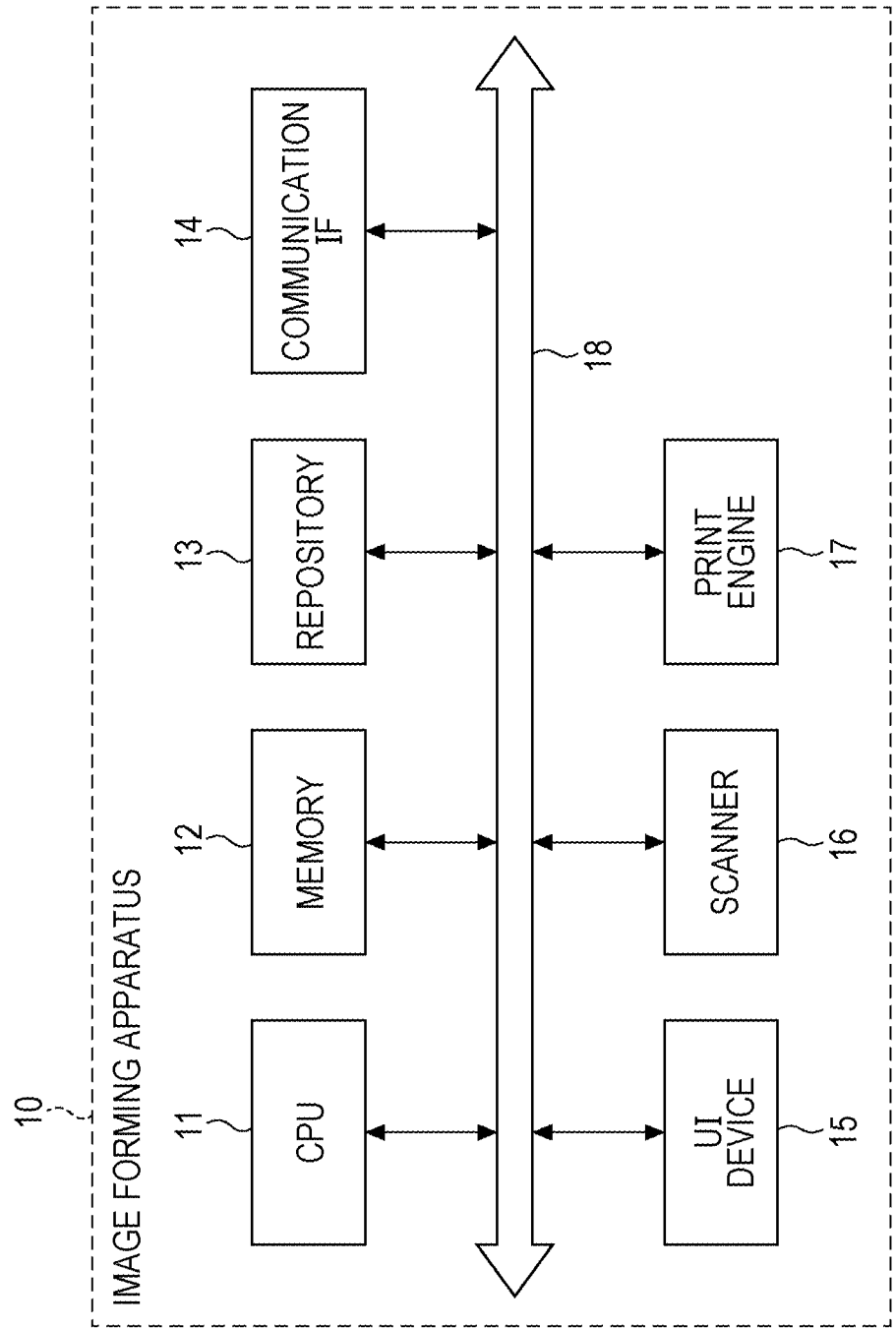
FIG. 2 is a block diagram depicting a hardware configuration of an image forming apparatus according to the exemplary embodiment of the present disclosure.

Next, FIG. 2 depicts a hardware configuration of the image forming apparatus 10 in the image forming system according to the present exemplary embodiment.

As depicted in FIG. 2, the image forming apparatus 10 includes a central processing unit (CPU) 11, a memory 12, a repository 13 such as a hard disk drive, a communication interface (abbreviated to IF) 14 that transmits and receives data to and from an external apparatus and the like via the network 30, a user-interface (abbreviated to UI) device 15 including a touch panel or a combination of a liquid crystal display and a keyboard, a scanner 16, and a print engine 17. These building units are connected to each other by using a control bus 18.

The print engine 17 prints an image on a recording medium such as a sheet of printing paper after performing processes such as charging, exposure, development, transfer, and fixing.

The CPU 11 is a processor that performs predetermined processing in accordance with a control program stored in the memory 12 or in the repository 13 and that controls operations of the image forming apparatus 10. Although the description in the present exemplary embodiment will be given assuming that the CPU 11 reads and executes the control program stored in the memory 12 or in the repository 13, it is also possible to provide the CPU 11 with the program stored in a storage medium such as a compact-disc read-only memory (CD-ROM).

Figure 3:
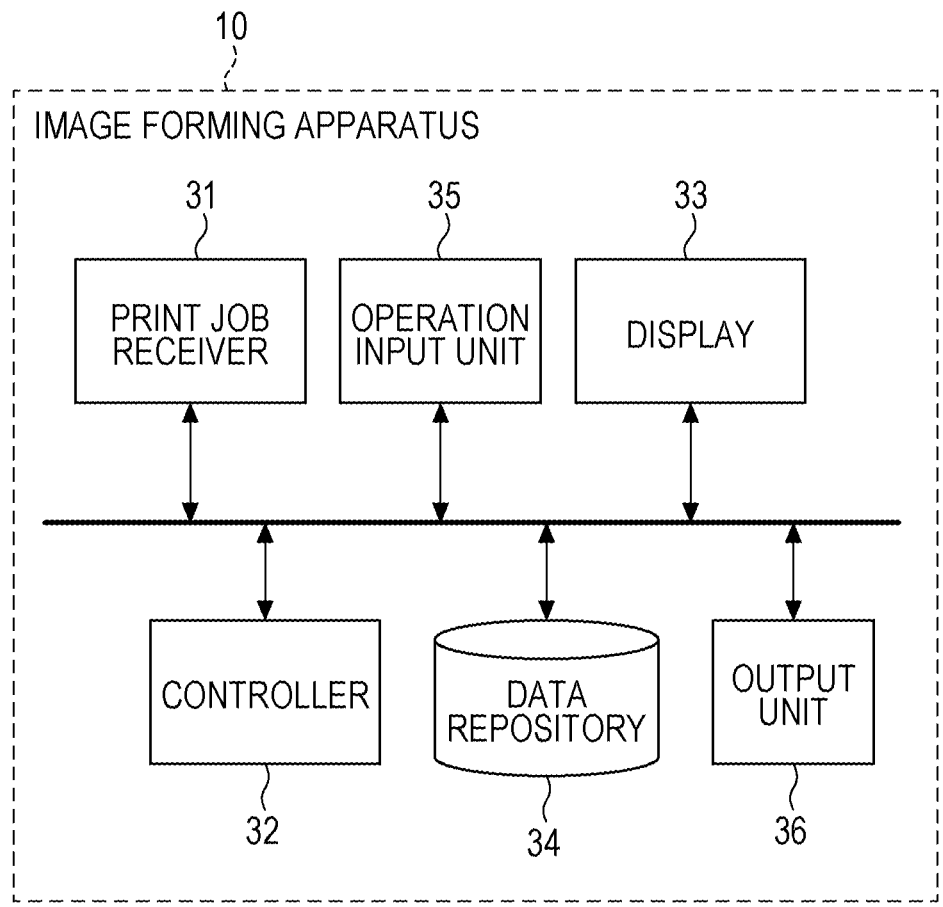
FIG. 3 is a block diagram depicting a functional configuration of the image forming apparatus according to the exemplary embodiment of the present disclosure.

FIG. 3 is a block diagram depicting a functional configuration of the image forming apparatus 10 realized by running the control program described above.

As depicted in FIG. 3, the image forming apparatus 10 according to the present exemplary embodiment includes a print job receiver 31, a controller 32, a display 33, a data repository 34, an operation input unit 35, and an output unit 36.

The print job receiver 31 receives a print job (an example of a print command) transmitted from the terminal apparatus 20.

The controller 32 performs control to create image data, which is to become print data, in accordance with a print job received by the print job receiver 31 and causes the output unit 36 to output the created image data.

The data repository 34 stores various kinds of data including the image data created by the controller 32.

The data repository 34 also stores a special-color-specification database to perform printing by using toners having a special color (hereinafter, referred to as special color printing). Specifically, color-specification text, which is predetermined specific text, an output toner having a special color (hereinafter, referred to as a special color toner), and the proportion of the output toner are associated with each other and stored in the data repository 34. The special color toner has a special color into which the color value of an object, which is assigned a color value identical or similar to the color value of the color-specification text in the image data, is converted. The object has a color identical or similar to the color of the color-specification text in the image data.

The color-specification text may be at least one preregistered character, and the specific examples include a character string, which is formed by a plurality of characters, and a special character such as an enclosed character.

A color value is a set of numbers used to specify a color and is given by a set of RGB values, which specifies each of the colors, red (R), green (G), and blue (B) by using a number ranging from 0 to 255 inclusive. A color value identical or similar to another color value indicates that each RGB value of one of the two color values agrees with the corresponding RGB value of the other of the two color values exactly or within an error of, for example, plus or minus two.

The display 33 is controlled by the controller 32 and displays various kinds of information to a user. The operation input unit 35 receives information regarding various operations performed by the user.

In accordance with control by the controller 32, the output unit 36 outputs an image on a recording medium such as a sheet of printing paper.

The controller 32 determines whether image data includes color-specification text in accordance with a print job received by the print job receiver 31. Specifically, the controller 32 recognizes a character code corresponding to color-specification text and determines whether the image data includes the character code corresponding to the color-specification text.

Then, if the image data includes the color-specification text, the controller 32 replaces the color value of one or more objects with a special color that is in advance associated with the color-specification text, each of the one or more objects being a portion assigned a color value identical or similar to the color value of the color-specification text to form an image. Each of the one or more objects has a color identical or similar to the color of the color-specification text.

Subsequently, in accordance with the control by the controller 32, the output unit 36 outputs an image in which the color value of each of the one or more objects has been replaced with the special color, and further, the controller 32 controls output of the image so that the image that is output does not include the color-specification text. This is because the color-specification text is the information representing a command from the user and is not supposed to be output when the image is output.

If the image data from which an image is formed includes no color-specification text, in accordance with the control by the controller 32, the output unit 36 outputs an image based on the image data by using basic color toners without using a special color toner.

In addition, if the image data includes no object assigned a color value to form an image, the color value being identical or similar to the color value of the color-specification text, which is included in the image data, the output unit 36 outputs an image based on the image data by using basic color toners without using a special color toner in accordance with the control by the controller 32.

If color-specification text associated with a special color appears at a plurality of positions in the image data and the color-specification text at each of the plurality of positions is assigned the same color value, in accordance with the control by the controller 32, the display 33 displays a warning screen to report to the user, who uses the image forming system, the fact that the color-specification text assigned the same color value appears at the plurality of positions. If color-specification text appears at a plurality of positions and the color-specification text located at each of the plurality of positions is assigned the same color value, it is likely that the user has input the text not as the color-specification text but as an image to output, in which case designating the text as the color-specification text leads to erroneous detection. Thus, in such a case as is described above, a warning screen is displayed and enables the user to check whether the user has designated the text as the color-specification text, and erroneous detection can be avoided.

Further, in accordance with the control by the controller 32, the display 33 presents two samples of the output image including one or more objects assigned a color value to form the image, the color value being identical or similar to the color value of the color-specification text located at a plurality of positions, one sample including the one or more objects that are output in the special color that is in advance associated with the color-specification text, the other sample being the image that is output without using a special color.

In accordance with the control by the controller 32, the operation input unit 35 accepts a result of selection by the user of which of the samples of the output image presented by the display 33 to be used to output the image.

Further, if color-specification text associated with a special color appears at a plurality of positions in the image data and is assigned different color values at the plurality of positions, in accordance with the control by the controller 32, the output unit 36 outputs one or more objects in the special color that is in advance associated with the color-specification text. The one or more objects are assigned a color value to form an image. Of the color values of the color-specification text at the plurality of positions, this color value is identical or similar to the color value of the color-specification text having a color value close to a predetermined color value of the color-specification text.

Figure 4:
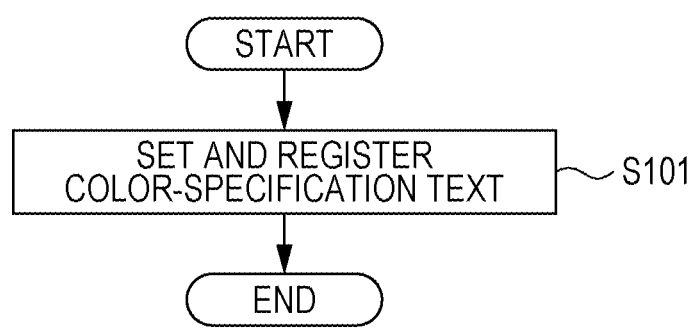
FIG. 4 is a flowchart depicting an operation for setting color-specification text by using a terminal apparatus.
Figure 6:
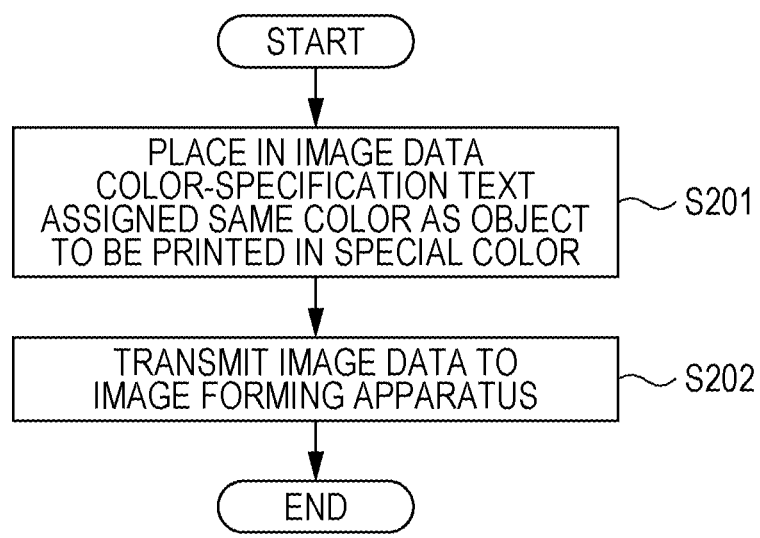
FIG. 6 is a flowchart depicting an operation for creating image data by using the terminal apparatus to perform special color printing.

Next, an operation for setting color-specification text to perform special color printing by using the image forming apparatus 10 will be described with reference to FIGS. 4 and 5. In this example, setting color-specification text by using the terminal apparatus 20 will be described. Color-specification text can also be set in a similar manner by using the display 33 of the image forming apparatus 10.

In step S101, a user operates the terminal apparatus 20 and connects the terminal apparatus 20 to the communication IF 14 of the image forming apparatus 10 via the network 30. Then, the data repository 34 stores a special-color-specification database in which a piece of text used as color-specification text is associated with a special color toner to output.

Specifically, in such a display screen as is depicted in FIG. 5, color-specification text, an output toner, and the proportion of the output toner are associated with each other and stored in the data repository 34. The output toner is used to output a color into which the color value of an object, which is assigned a color value identical or similar to the color value of the color-specification text, is converted. For example, in response to a user operation on the terminal apparatus 20, the color-specification text "金" is associated with the output toner "Gold" and the proportion of the output toner "100%", and the settings are stored in the data repository 34. Similarly, the color-specification text "銀" is associated with the output toner "Silver" and the proportion of the output toner "100%", and the settings are stored in the data repository 34.

Next, an operation for creating image data by using the terminal apparatus 20 to perform special color printing will be described with reference to FIGS. 6 to 9.

First, in step S201, color-specification text having the same color value as an object to be printed in a special color is placed in the image data in response to a user operation.

Figure 7:
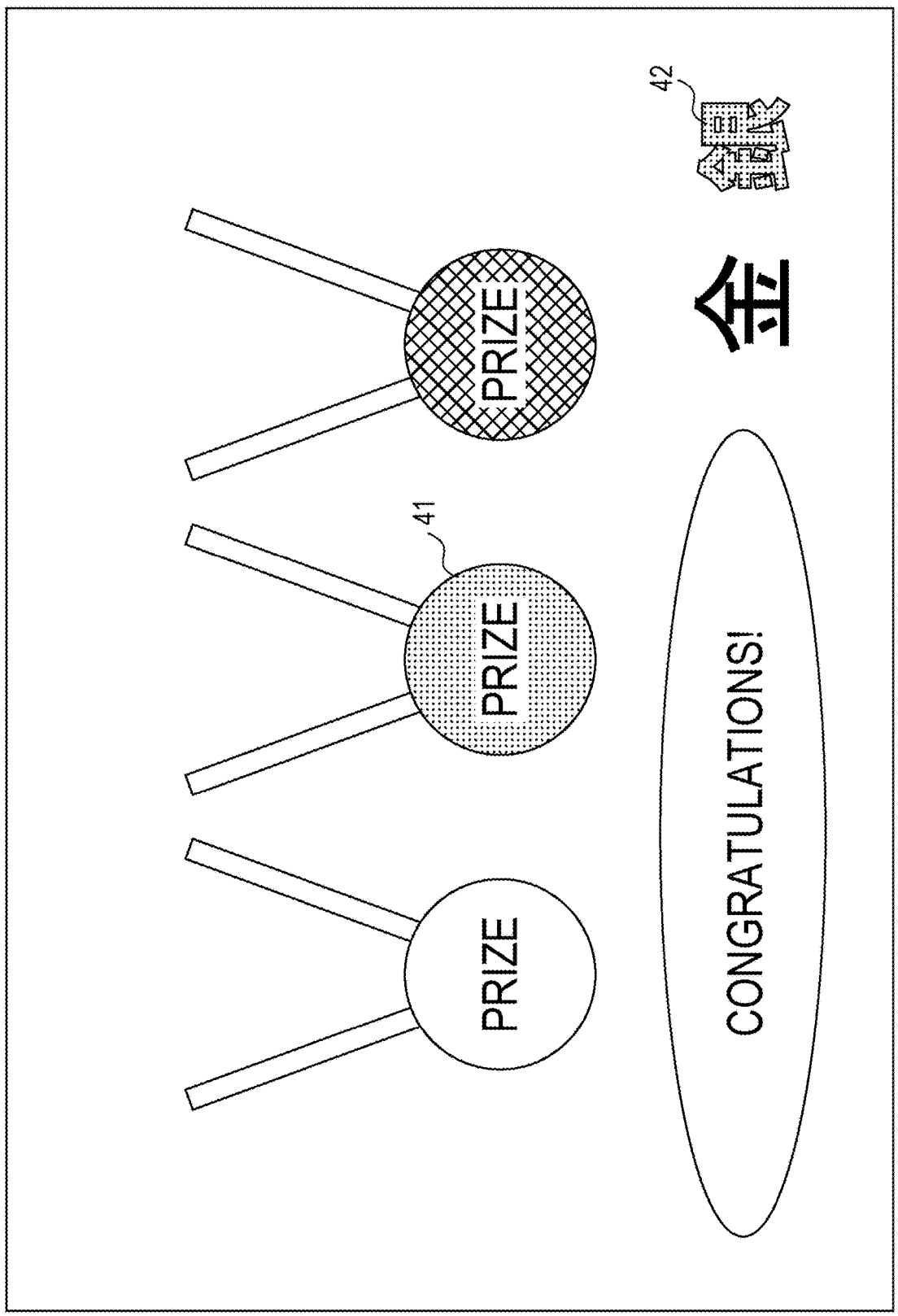
FIG. 7 is an illustration depicting an example of a display screen displayed by the terminal apparatus for creating image data to perform special color printing.
Figure 8:
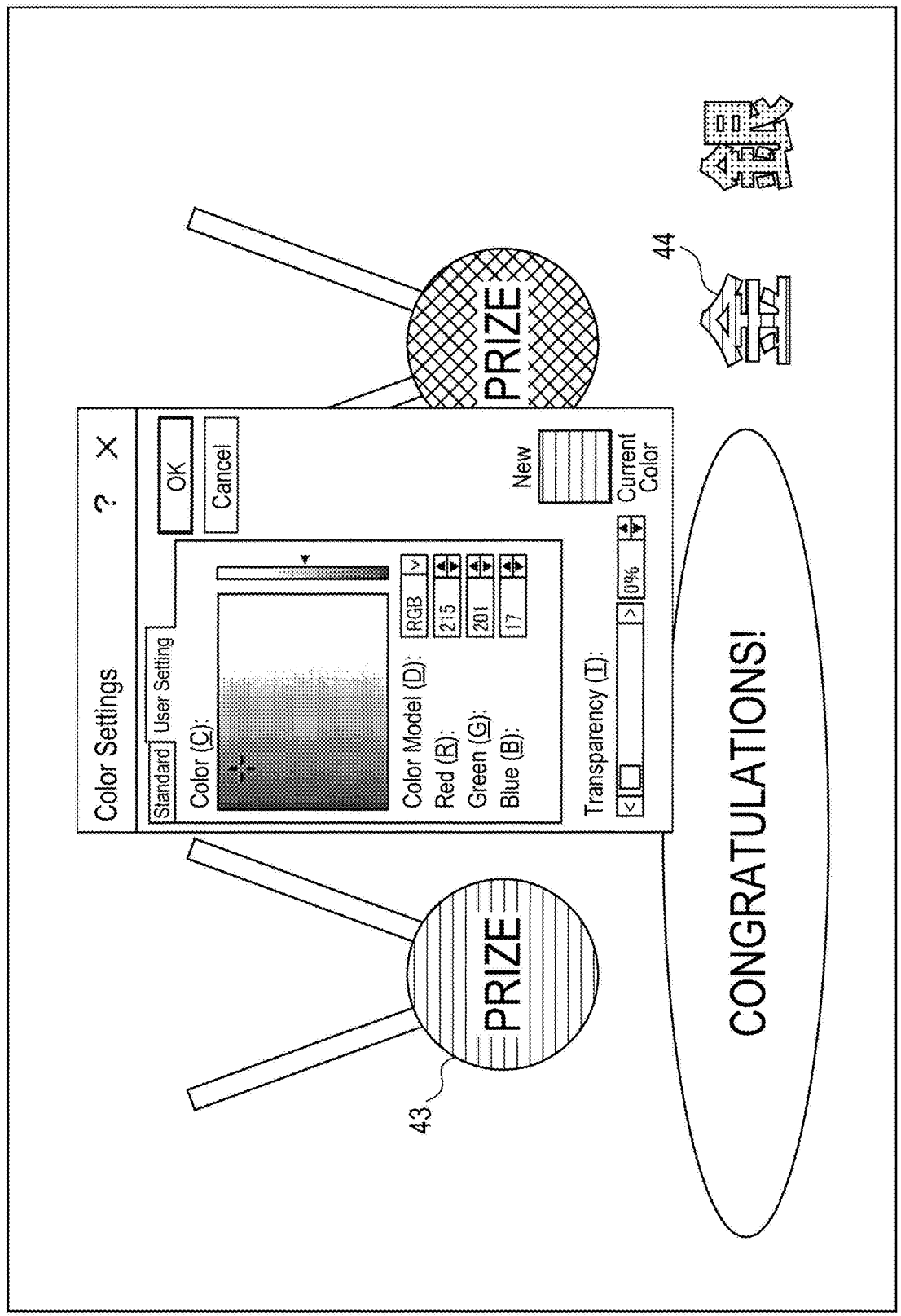
FIG. 8 is an illustration depicting an example of a display screen displayed by the terminal apparatus for creating image data to perform special color printing.

Specifically, as depicted in FIG. 7, color-specification text 42 is placed in the image data. The color-specification text 42 is assigned the same color as an object 41 to be printed in a special color by using the "Silver" toner, which is a special color toner. Similarly, as depicted in FIG. 8, color-specification text 44 is placed in the image data. The color-specification text 44 is assigned the same color as an object 43 to be printed in a special color by using the "Gold" toner, which is a special color toner.

Figure 9:
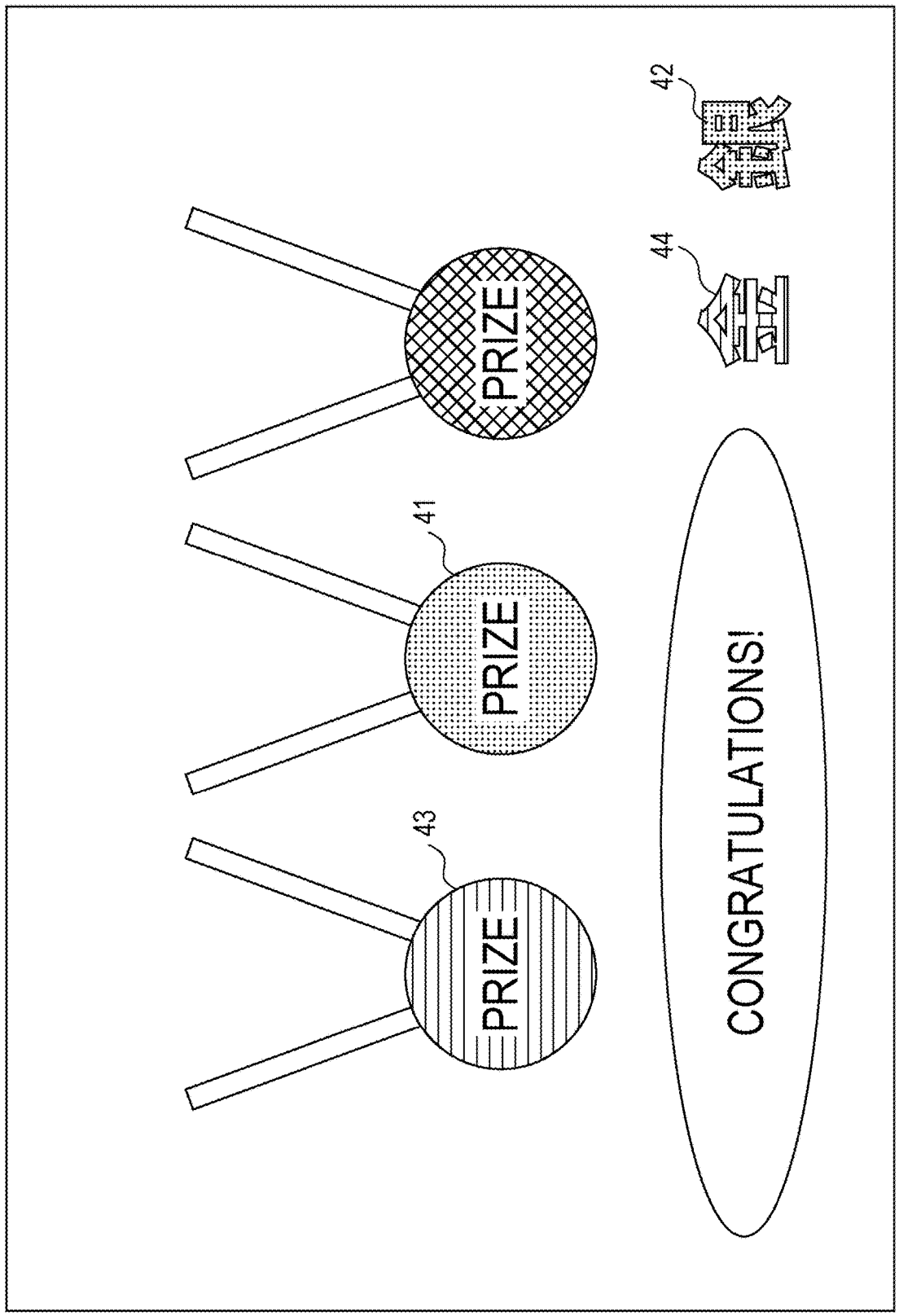
FIG. 9 is an illustration depicting an example of a display screen displayed by the terminal apparatus for creating image data to perform special color printing.
Figure 10:
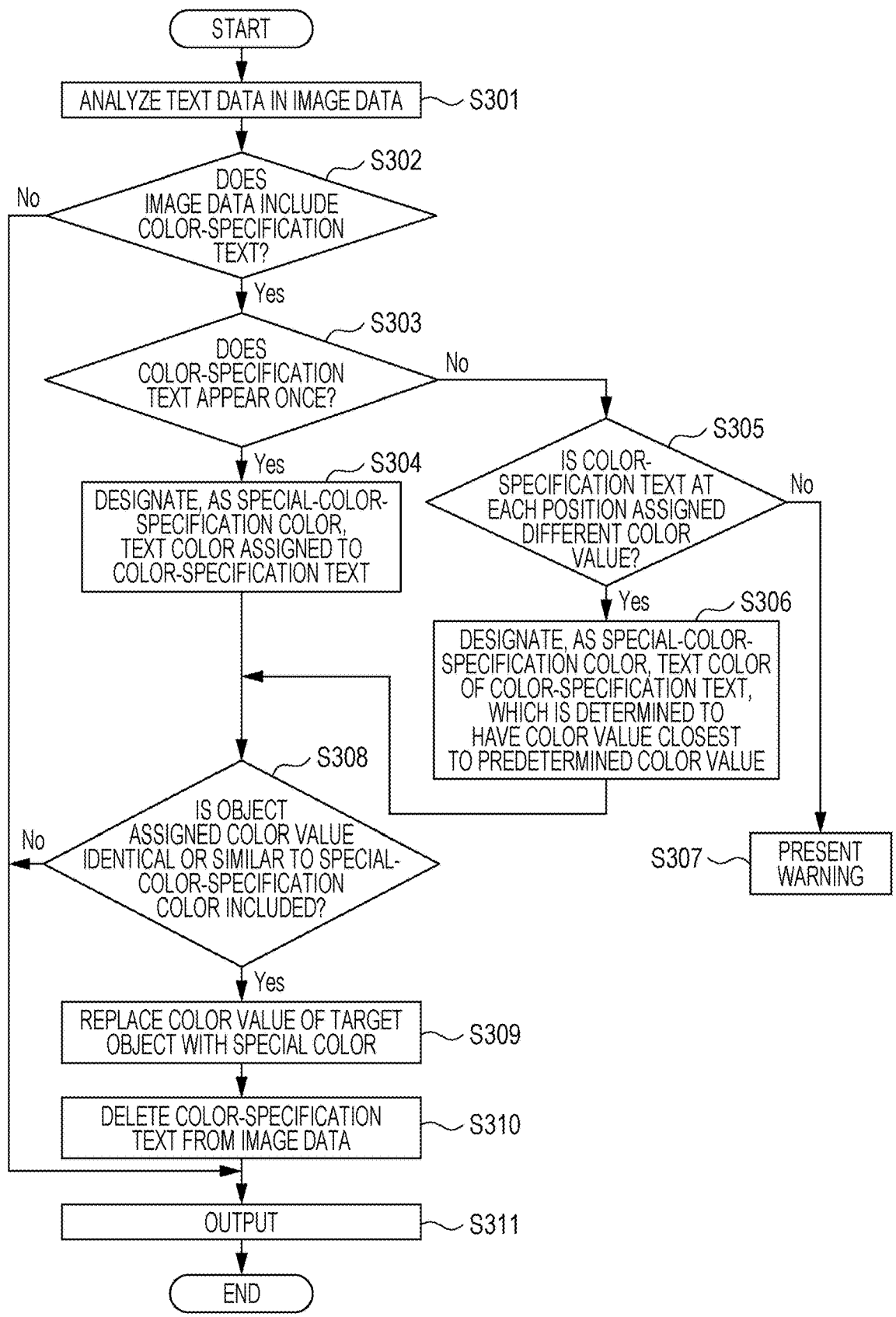
FIG. 10 is a flowchart depicting an operation for performing special color printing by using the image forming apparatus.

Then, in step S202, the image data containing such color-specification text 42 and 44 as is depicted in FIG. 9 is transmitted to the image forming apparatus 10 in response to a user operation.

Next, an operation of the image forming apparatus 10 will be described with reference to FIGS. 10 to 17.

In response to the print job receiver 31 receiving the image data, the controller 32 analyzes text data contained in the image data in step S301. For example, the controller 32 analyzes text data contained in the image data by searching for a character code sequence in the binary data.

Then, in step S302, the controller 32 determines whether the image data includes color-specification text. For example, the controller 32 determines whether the character codes in the binary data include a character code corresponding to color-specification text.

If it is determined in step S302 that the image data includes color-specification text, the controller 32 determines in step S303 whether the color-specification text appears once in the image data.

If it is determined in step S303 that the color-specification text appears once in the image data, the controller 32 designates the color value of the text color assigned to the color-specification text as a color specified for a special color (hereinafter, referred to as a special-color-specification color) in step S304.

Then, in step S308, the controller 32 determines whether the image data includes at least one object assigned a color value that is identical or similar to the color value of the special-color-specification color.

Then, if it is determined in step S308 that the image data includes at least one object assigned a color value that is identical or similar to the color value of the special-color-specification color (hereinafter, the at least one object being referred to as a target object), in step S309, the controller 32 replaces the color value of the target object with the special color of the output toner that corresponds to the color-specification text stored in the data repository 34.

Then, in step S310, the controller 32 deletes the color-specification text 42 and 44 from the image data.

Subsequently, the output unit 36 outputs the image data in step S311. Specifically, the color values of the objects 41 and 43 are replaced with the special colors "Silver" and "Gold", respectively, as depicted in FIG. 11. The object 41 is assigned the same color value as the special-color-specification color assigned to the color-specification text 42, and the object 43 is assigned the same color value as the special-color-specification color assigned to the color-specification text 44, as depicted in FIG. 9. Then, the color-specification text 42 and 44 is deleted, and the image data printed in the special colors by using the special color toners is output.

If it is determined in step S303 described above that the same color-specification text appears at a plurality of positions in the image data, the controller 32 determines in step S305 whether the color-specification text at each of the plurality of positions is assigned a different color value.

If it is determined in step S305 that the color-specification text at each of the plurality of positions is assigned a different color value, in step S306, the controller 32 designates as the color-specification text the text assigned the color value closest to the color value assigned to the color-specification text and designates the text color of the color-specification text as the special-color-specification color. Then, in step S308 described above, the controller 32 determines whether the image data includes at least one object assigned a color value that is identical or similar to the color value of the special-color-specification color.

Figure 12B:
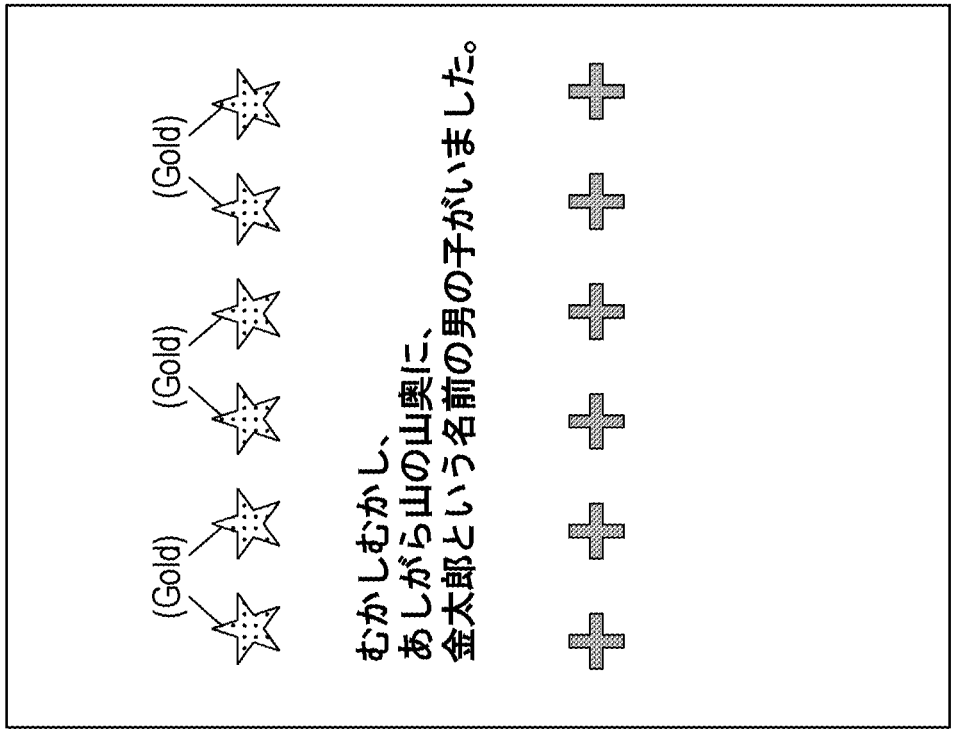
FIG. 12B is an illustration depicting an output result for the image data depicted in FIG. 12A.
Figure 12A:
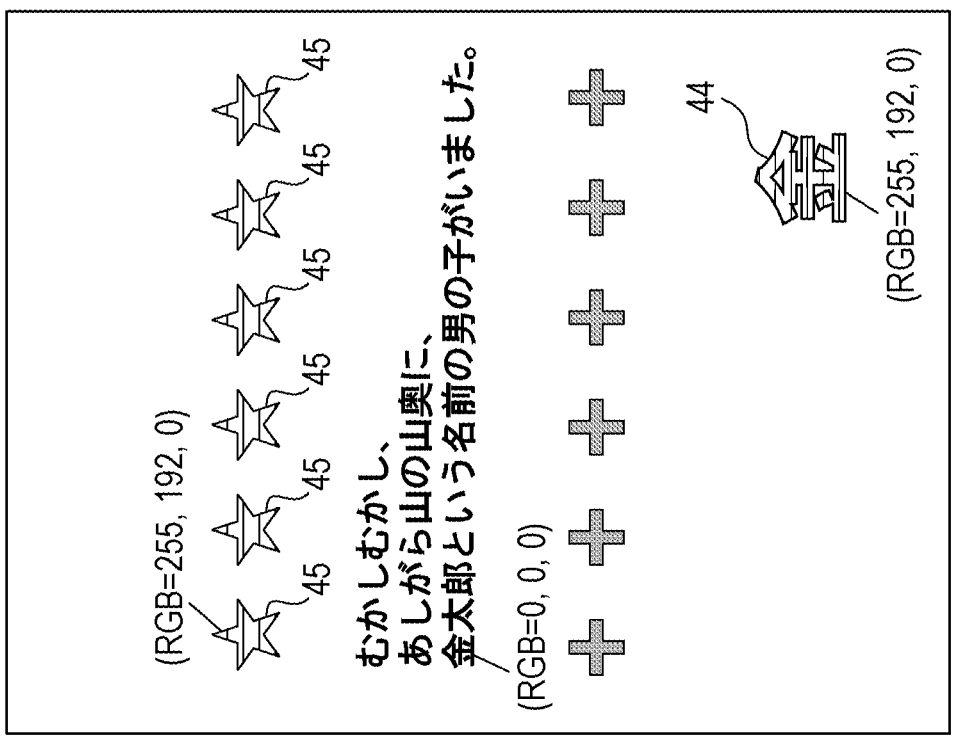
FIG. 12A is an illustration depicting an example of image data to perform special color printing.

Specifically, when such image data as is depicted in FIG. 12A undergoes special color printing, it is determined that the color-specification text " 金 " appears at a plurality of positions. In other words, the text data in the image data includes the color-specification text at a plurality of positions in some cases. If the color-specification text " 金 " is detected at two positions in the image data in this way with the color-specification text at one position having RGB values (0, 0, 0) and the color-specification text at the other position having RGB values (255, 192, 0), the color values of the color-specification text at the two positions differ from each other. The RGB values (255, 192, 0) are close to the RGB values (215, 210, 17) of the output toner of the text " 金 " designated as the color-specification text, and thus the text " 金 " having RGB values (255, 192, 0) is designated as the color-specification text. Then, the RGB values (255, 192, 0) of the color-specification text " 金 " are designated as the RGB values of a special-color-specification color. In other words, the color represented by these RGB values is the color to be replaced with the special color.

Then, in step S309, objects 45, which are assigned the same color value as the special-color-specification color, are designated as target objects, and the color value of the target objects is replaced with the color of the output toner "Gold", which corresponds to the text " 金 " designated as the color-specification text. Subsequently, as depicted in FIG. 12B, in step S310, the controller 32 deletes the color-specification text 44 from the image data, and the output unit 36 outputs the image data in step S311.

If it is determined in step S305 described above that the color-specification text at each of the plurality of positions has no difference in the color value, in step S307, the controller 32 causes the display screen of the terminal apparatus 20 or the display 33 of the image forming apparatus 10 to display a warning screen.

Figure 13B:
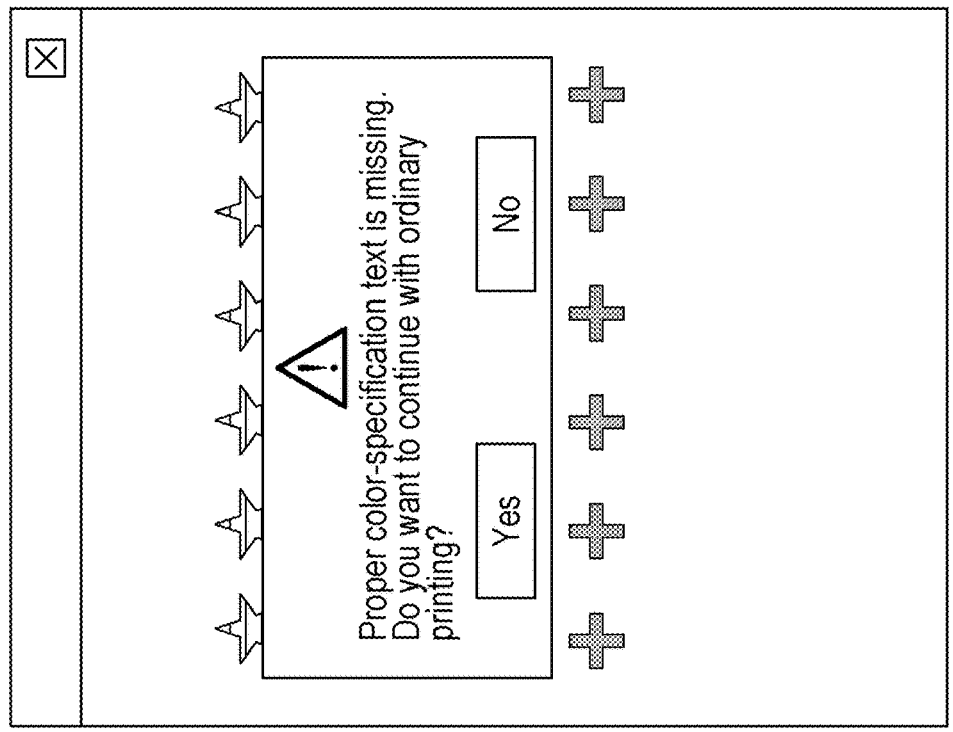
FIG. 13B is an illustration depicting an example of a warning screen displayed by the terminal apparatus when the image data depicted in FIG. 13A is output.
Figure 13A:
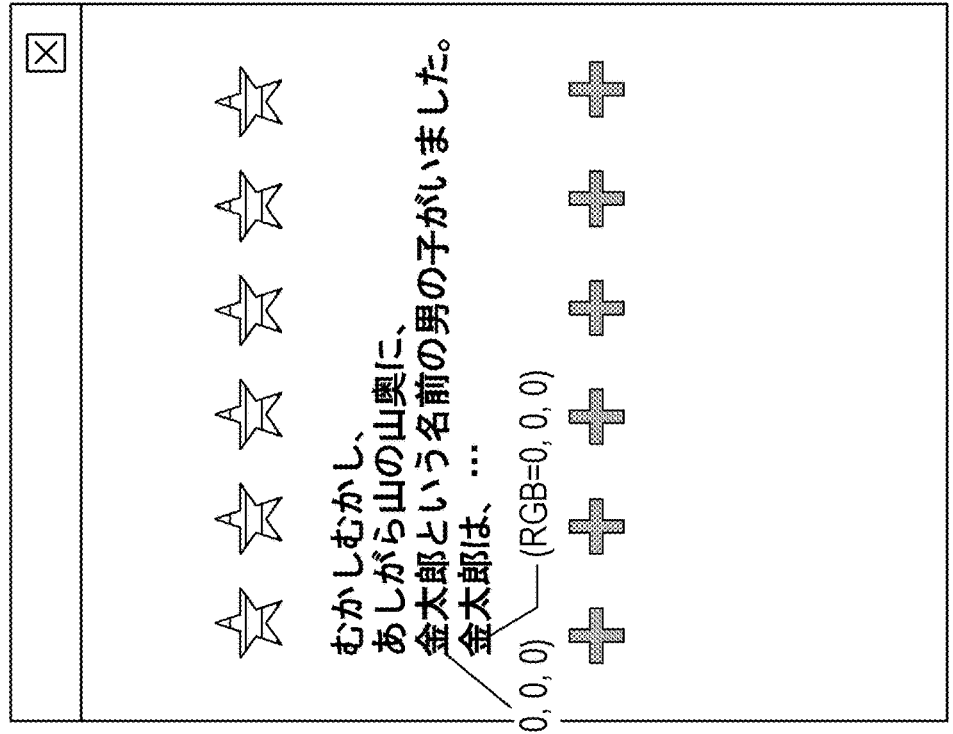
FIG. 13A is an illustration depicting an example of image data displayed on the display screen of the terminal apparatus.

Specifically, when such image data as is depicted in FIG. 13A undergoes special color printing, the color-specification text is detected at a plurality of positions. Then, if it is determined that the color-specification text at each of the plurality of positions has no difference in the color value, the display screen of the terminal apparatus 20 or the display 33 of the image forming apparatus 10 displays such a warning screen as is depicted in FIG. 13B. In other words, a warning screen is displayed to check with the user whether to continue ordinary printing in which printing is performed based on ordinary toners by using basic color toners without using a special color toner. In addition, a warning screen may be displayed so that the user can select whether to delete the detected color-specification text.

Figure 15:
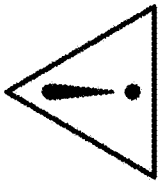
FIG. 15 is an illustration depicting a modification of the warning screen displayed by the terminal apparatus when the image data depicted in FIG. 13A is output.

FIGS. 14 and 15 are each an illustration depicting a modification of the warning screen depicted in FIG. 13B.

If it is determined that color-specification text appears at a plurality of positions in the image data with no difference in the color value, the display screen of the terminal apparatus 20, as depicted in FIG. 14, presents two samples of an output image including one or more objects assigned a color value to form an image, the color value being identical or similar to the color value of the color-specification text located at the plurality of positions. One sample, which is "printing by using a special color toner", includes the one or more objects that are output in the special color that is in advance associated with the color-specification text, and the other sample, which is "printing by using ordinary toners", outputs the image by using basic colors without using a special color.

Specifically, the controller 32 determines that the color-specification text " 金 " appears at a plurality of positions in the image data with an identical color value or a similar color value and designates RGB values (0, 0, 0) of the color-specification text " 金 " as a special-color-specification color. Then, the controller 32 causes two samples of an output image to be presented. In one sample, the color value of the text assigned RGB values (0, 0, 0), which is the same color value as the special-color-specification color, is replaced with a color value that approximates the color of a special color toner that is in advance associated with the color-specification text, and in the other sample, the color value of the text is not replaced.

Then, the user is able to check the samples of the output image displayed on the display screen of the terminal apparatus 20 or by the display 33 of the image forming apparatus 10 and select "printing by using a special color toner", in which the image data is printed by using a special color toner, or "printing by using ordinary toners", in which the image data is printed by using basic color toners.

Further, as depicted in FIG. 13A, if it is determined that the color value of the color-specification text in the image data is given by RGB values (0, 0, 0) and that the color value corresponds to black, for example, such a warning screen as is depicted in FIG. 15 may be presented on the display screen of the terminal apparatus 20 or by the display 33 of the image forming apparatus 10, and the user may be allowed to select "printing by using a special color toner" or "printing by using ordinary toners".

If it is determined in step S308 described above that the image data does not include a target object assigned a color value identical or similar to the color value of the special-color-specification color, the output unit 36 outputs the image as it is in basic colors by using ordinary toners without using a special color toner in step S311. Specifically, if the image data includes color-specification text "金" assigned a color value given by RGB values (255, 0, 0), as depicted in FIG. 16A, it is determined that a target object assigned an identical color value or a similar color value is absent. Then, the controller 32 does not delete the color-specification text "金" as depicted in FIG. 16B, and the output unit 36 outputs the image in basic colors by using ordinary toners. In other words, it is determined that the user has not specified special color printing.

Figure 17A:
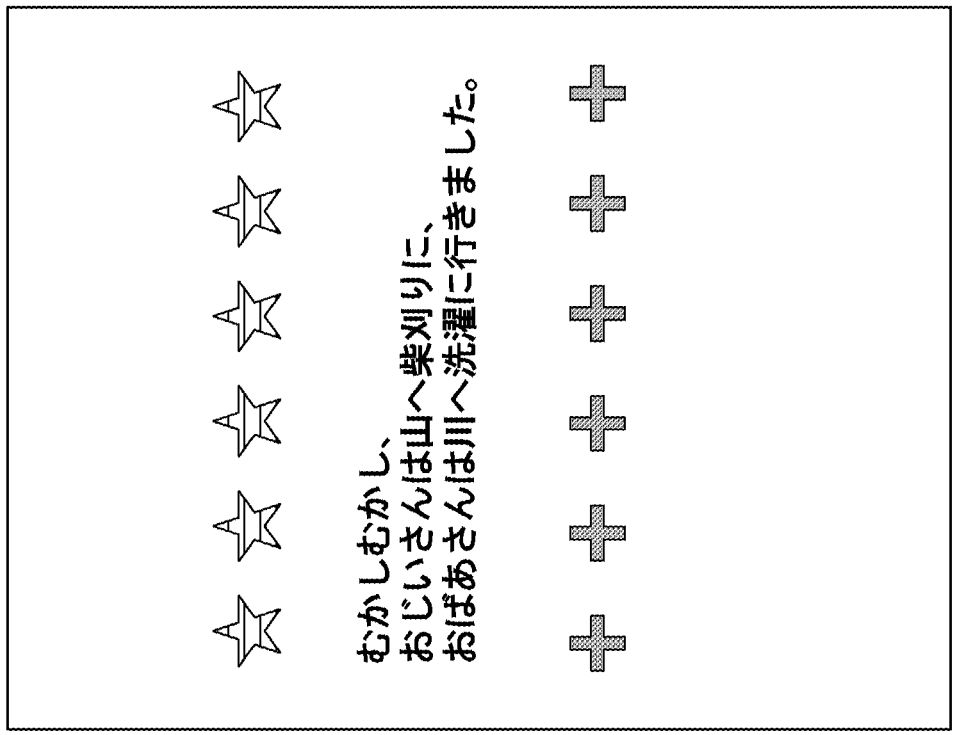
FIG. 17A is an illustration depicting an example of image data.
Figure 17B:
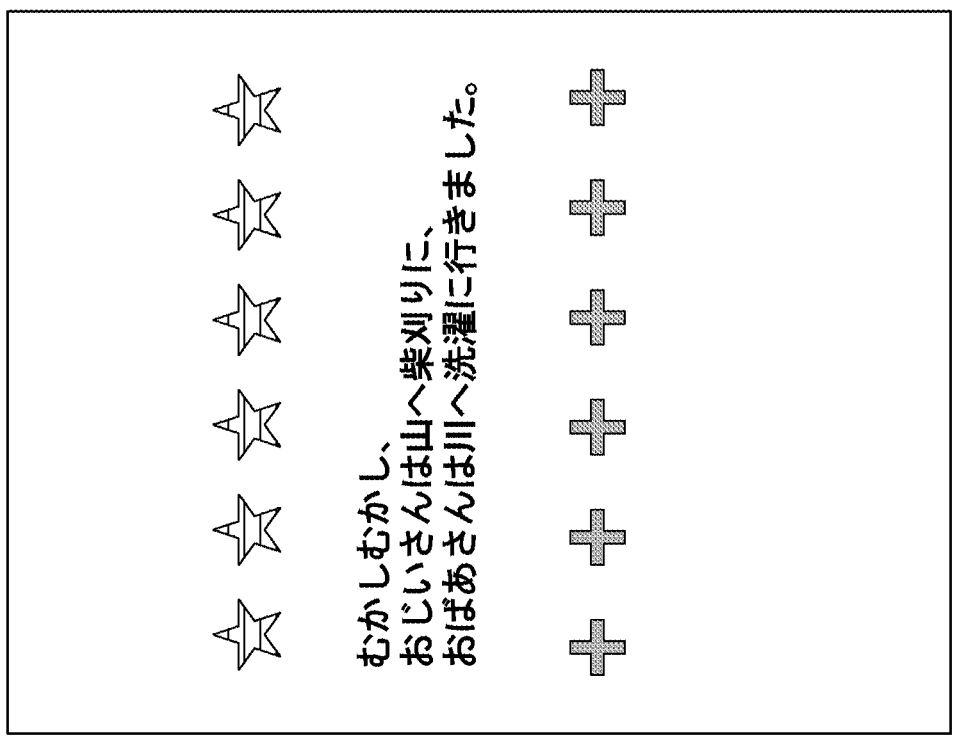
FIG. 17B is an illustration depicting an output result for the image data depicted in FIG. 17A.

Further, if it is determined in step S302 described above that the image data does not include color-specification text, the output unit 36 outputs the image as it is in basic colors by using ordinary toners without using a special color toner in step S311. Specifically, such image data as is depicted in FIG. 17A is output in basic colors by using ordinary toners as depicted in FIG. 17B. In other words, it is determined that the user has not specified special color printing.

FIG. 18 is an illustration depicting a modification of the display screen displayed by the terminal apparatus 20 for setting color-specification text.

As depicted in FIG. 18, a plurality of character strings, a special character such as an enclosed character, and the like may be registered as color-specification text in advance and stored in the data repository 34 by using a display screen displayed for setting color-specification text.

Figures 19A, 19B:
FIG. 19A is an illustration depicting an example of the display screen of the terminal apparatus to register color-specification text in a dictionary.
FIG. 19B is an illustration depicting an example of an operation of the display screen of the terminal apparatus after the color-specification text is registered in the dictionary.

In addition, as depicted in FIG. 19A, color-specification text may be associated with a plurality of input character strings and registered in advance so that the input character strings are converted into the color-specification text for inputting the color-specification text. Further, as depicted in FIG. 19B, a candidate for color-specification text may be presented in response to an input character string being input for inputting the color-specification text.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a memory; and
a processor configured to
output an image formed based on image data including predetermined specific text after replacing a color of one or more portions in the image data with a special color that is in advance associated with the specific text, the one or more portions being assigned a color identical or similar to a color of the specific text to form the image.

2. The image forming apparatus according to claim 1, wherein the processor is configured to control output of the image so that the image that is output does not include the specific text.

3. The image forming apparatus according to claim 1, wherein the processor is configured to provide a user with information if the specific text associated with the special color appears at a plurality of positions in the image data and is assigned the same color value at the plurality of positions, the information concerning a fact that the specific text assigned the same color value appears at the plurality of positions in the image data.

4. The image forming apparatus according to claim 3, wherein the processor is configured to present two samples of an output image including the one or more portions assigned a color to form the image, the color assigned to the one or more portions being identical or similar to the color of the specific text located at the plurality of positions, and accept a result of selection by the user of which sample to be used to output the image, one sample including the one or more portions that are output in the special color that is in advance associated with the specific text, the other sample being the output image that is output without using the special color.

5. The image forming apparatus according to claim 1, wherein the processor is configured to output the one or more portions in the special color that is in advance associated with the specific text, and
wherein if the specific text associated with the special color appears at a plurality of positions in the image data and is assigned different color values at the plurality of positions, the one or more portions are portions assigned a color to form the image, the color assigned to the one or more portions being identical or similar to a color of the specific text that is located at one of the plurality of positions and that is assigned a color value close to a predetermined color value.

6. The image forming apparatus according to claim 1, wherein the processor is configured to output the image based on the image data without using the special color if the image data includes no portion assigned a color to form the image, the color assigned to the no portion being identical or similar to the color of the specific text included in the image data from which the image is formed.

7. The image forming apparatus according to claim 1, wherein the specific text is a character string or at least one preregistered special character, the character string being formed by a plurality of characters.

8. The image forming apparatus according to claim 2, wherein the specific text is a character string or at least one preregistered special character, the character string being formed by a plurality of characters.

9. The image forming apparatus according to claim 3, wherein the specific text is a character string or at least one preregistered special character, the character string being formed by a plurality of characters.

10. The image forming apparatus according to claim 4, wherein the specific text is a character string or at least one preregistered special character, the character string being formed by a plurality of characters.

11. The image forming apparatus according to claim 5, wherein the specific text is a character string or at least one preregistered special character, the character string being formed by a plurality of characters.

12. The image forming apparatus according to claim 6, wherein the specific text is a character string or at least one preregistered special character, the character string being formed by a plurality of characters.

13. A non-transitory computer readable medium storing a program causing a computer to execute a process for image formation, the process comprising:

outputting an image formed based on image data including predetermined specific text after replacing a color of one or more portions in the image data with a special color that is in advance associated with the specific text, the one or more portions being assigned a color identical or similar to a color of the specific text to form the image, and controlling output of the image so that the image that is output does not include the specific text.

14. An image forming apparatus comprising:

means for storing data; and means for outputting an image formed based on image data including predetermined specific text after replacing a color of one or more portions in the image data with a special color that is in advance associated with the specific text, the one or more portions being assigned a color identical or similar to a color of the specific text to form the image.

* * * * *